US012763820B2

(12) United States Patent
Watling et al.

(10) Patent No.: US 12,763,820 B2
(45) Date of Patent: Oct. 13, 2026

(54) LINEARIZING BEAM-FORMING TRANSMISSION SYSTEM

(71) Applicant: pSemi Corporation, San Diego, CA (US)

(72) Inventors: David Watling, New Milton Hampshire (GB); John Birkbeck, New Milton Hampshire (GB)

(73) Assignee: PSEMI CORPORATION, San Diego, CA (US)

( * ) Notice: Subject to any disclaimer, the term of this patent is extended or adjusted under 35 U.S.C. 154(b) by 0 days.

(21) Appl. No.: 18/779,363

(22) Filed: Jul. 22, 2024

(65) Prior Publication Data

US 2025/0038798 A1 Jan. 30, 2025

Related U.S. Application Data

(60) Provisional application No. 63/515,759, filed on Jul. 26, 2023.

(51) Int. Cl.
*H04B 7/0456* (2017.01)
*H04B 7/0426* (2017.01)

(52) U.S. Cl.
CPC ............. *H04B 7/046* (2013.01); *H04B 7/043* (2013.01); *H04B 7/0478* (2013.01)

(58) Field of Classification Search
CPC ...................................................... H04B 7/046
USPC .......................................................... 375/262
See application file for complete search history.

(56) References Cited

U.S. PATENT DOCUMENTS 5,471,146 A * 11/1995 Krayeski .............. H04B 17/318 455/67.11
2016/0254870 A1 9/2016 O'Keeffe et al.
2018/0287569 A1* 10/2018 Xu ............................ H03F 3/20
2020/0411981 A1 12/2020 Kimball
2021/0351816 A1* 11/2021 Raghavan ............. H04L 5/0023
2023/0198560 A1 6/2023 Tiebout et al.
2026/0006474 A1* 1/2026 Rosa ..................... H04W 24/10

OTHER PUBLICATIONS

International Search Report and Written Opinion issued for International Patent Application No. PCT/US2024/038954 filed on Jul. 22, 2024 on behalf of pSemi Corporation. Mail Date: Nov. 4, 2024. 10 pages.

* cited by examiner

*Primary Examiner* — Lihong Yu
(74) *Attorney, Agent, or Firm* — Steinfl + Bruno LLP

(57) ABSTRACT

Beamforming transceiver system architectures and methods that enable linearizing beamforming transmissions. In a first embodiment, a transmit-side signal of a first polarity is sampled and provided through a feedback path utilizing sections of the second polarity receive-side circuitry to a single node for subsequent analysis. Analysis circuitry may set parameter values within a digital pre-distortion circuit and/or control signals for directing the control of various weights and parameter values, including voltages for the power rails of a beamforming transceiver IC, adjustments to individual power amplifier drain current and/or cascode gate bias voltage, adjustment of beam weights, adjustment of various other controls within the IC.

18 Claims, 14 Drawing Sheets

LINEARIZING BEAM-FORMING TRANSMISSION SYSTEM

CROSS-REFERENCE TO RELATED APPLICATIONS

The present application claims priority to the following provisional patent application, assigned to the assignee of the present invention, the contents of which are incorporated by reference: U.S. Patent Application Ser. No. 63/515,759, filed Jul. 26, 2023, entitled "Linearizing Beam-Forming Transmission System".

BACKGROUND

(1) Technical Field

This invention relates to electronic circuits, and more particularly to testing and calibration architectures for radio frequency integrated circuits.

(2) Background

Many modern electronic systems include radio frequency (RF) transceivers; examples include personal computers, tablet computers, wireless network components, televisions, cable system "set top" boxes, radar systems, and cellular telephones. Many RF transceivers are quite complex two-way radios that transmit and receive RF signals. In some cases, RF transceivers are capable of transmitting and receiving across multiple frequencies in multiple bands; for instance, in the United States, the 2.4 GHz band is divided into 14 channels spaced about 5 MHz apart. As another example, a modern "smart telephone" may include RF transceiver circuitry capable of concurrently operating on different cellular communications systems (e.g., GSM and CDMA), on different wireless network frequencies and protocols (e.g., various IEEE 802.1 "WiFi" protocols at 2.4 GHz and 5 GHz), and on "personal" area networks (e.g., Bluetooth based systems).

RF integrated circuits (ICs) may include a number of different RF signal paths and involve multiple inputs and outputs, such as is the case with multi-antenna/multi-transceiver RF ICs. Such RF IC's may be used, for example, in communication or radar systems that utilize beamforming (also known as beam steering) techniques for directional signal transmission and/or reception. Beamforming combines transmit/receive elements in a phased array in such a way that signals at particular angles experience constructive interference while other signals at other angles experience destructive interference. Beamforming can be used at both the transmitting and receiving ends of a communication system in order to achieve spatial selectivity. Another advantage of beamforming is that the directional nature of the link means that less power needs to be transmitted to achieve a good signal-to-noise ratio at the receiver because all of the signal energy is directed at the receiver rather than being dispersed omni-directionally.

FIG. 1A is a block diagram of one prior art transceiver system 100 that includes an IC 102 that supports four external patch antennas 104*a*-104*d*. FIG. 1B is a simplified symbolic block diagram of a beamforming transceiver "tile" 150 representing the IC 102 and four patch antennas 104*a*-104*d* of FIG. 1A. An external baseband signal generator 106 provides a baseband signal to a modulation circuit 108, which outputs a modulated signal. A frequency conversion circuit 110 generates horizontally and vertically polarized RF signals from the modulated signal, which are coupled to input/output ports H, V of the IC 102. An amplifier block 112 includes both horizontal (H) and vertical (V) polarization power amplifiers (PAS) $Tx_H$, $Tx_V$ and low-noise amplifiers (LNAs) $Tx_H$, $Rx_V$ that may be selectively coupled to a corresponding input/output port H, V and a corresponding H-splitter 114 or V-splitter 116 (which may be, for example, Wilkinson power dividers). Note that the PAs and the LNAs may comprise multiple stages of amplification, and may include parallel amplification stages to provide additional power.

H-polarized RF signals pass through the H-splitter 114 to and from blocks of selectable transmission-side phase-and-gain control elements (PGCEs) 118 and reception-side PGCEs 119 (only one of each is labelled to avoid clutter). Similarly, V-polarized RF signals pass through the V-splitter 116 to and from blocks of selectable transmission-side PGCEs 120 and reception-side PGCEs 121 (only one of each is labelled to avoid clutter). When receiving signals from the PGCEs 118, 119, the H-splitter 114 and V-splitter 116 function as combiners.

Each PGCE 118, 120 in a transmission path is coupled to a PA $T_{Hn}$ or $T_{Vn}$ (n=1-4 in this example) which in turn can be coupled to the input port of a respective directional coupler CPLR. Each directional coupler CPLR may be, for example, a 20 dB broadside directional coupler which splits off about 1% of the incident power to a coupled port while the rest of the incident power is applied through an output port to a corresponding patch antenna 104*a*-104*d*. In the illustrated example, the small fraction of incident power from the coupled port of a directional coupler CPLR is applied to a corresponding power detector block PD. Each PGCE 119, 121 in a receive path is coupled to an LNA $R_{Hn}$ or $R_{Vn}$ (n=1-4 in this example) which in turn can be selectively coupled to a corresponding patch antenna 104*a*-104*d*.

The PGCEs 118-121 (blocks denoted as "ΔG, Δθ") can be individually set to "beam weights" (comprising a gain (attenuation) level and phase angle for received RF signals) under the control of an on-chip controller 122. The on-chip controller 122 can also set modes of operation (e.g., selecting between transmitting/receiving H and V polarities concurrently or individually, or frequency ranges, test and calibration modes, and/or coarse gain settings), and bias settings for the PAs and LNAs that affect amplifier gain, power capability, and/or linearity. An external block 124 provides support circuitry and a control interface, such as connection to a control bus (e.g., the Serial Peripheral Interface-SPI-serial bus) and provision of power to power rails (e.g., $V_{DD\text{-}Tx}$ and $V_{DD\text{-}Rx}$) within the IC 102.

While the prior art transceiver system 100 offers good performance in general, the present invention improves a number of aspects of a transceiver system, particularly at high transmission power level.

SUMMARY

The present invention encompasses beamforming transceiver system architectures and methods that enable linearizing beamforming transmissions.

In a first embodiment, a transmit-side signal of a first polarity is sampled and provided through a feedback path utilizing sections of the second polarity receive-side circuitry to a single node for subsequent analysis. Thus, all feedback paths may be aggregated to replicate the transmitted signal seen by a user such that the replicated signals are conveyed back as a "virtual beam" to a single node for analysis and further action. Analysis circuitry may set parameter values within a digital pre-distortion circuit and/or control signals for directing the control of various weights and parameter values, including voltages for the power rails of a beamforming transceiver IC, adjustments to individual power amplifier drain current and/or cascode gate bias voltage, adjustment of beam weights, adjustment of various other controls within the IC, etc.

In another aspect, the invention encompasses a beamforming transceiver system including a first signal port configured to convey a signal having a first polarization; a second signal port configured to normally convey a signal having a second polarization; at least one transmit signal path, coupled to the first signal port, for conveying signals derived from a signal applied to the first signal port and having the first polarization; at least one directional coupler, each having an input port coupled to a respective transmit signal path, an output port configured to be selectably coupled to a respective antenna, and a coupled port; and at least one transmitted signal feedback path coupled between the coupled port of a respective directional coupler and the second signal port; wherein feedback signals conveyed through the coupled port of the at least one directional coupler and having the first polarization are coupled through the respective transmitted signal feedback path to the second signal port.

The details of one or more embodiments of the invention are set forth in the accompanying drawings and the description below. Other features, objects, and advantages of the invention should be apparent from the description and drawings, and from the claims.

DESCRIPTION OF THE DRAWINGS

Like reference numbers and designations in the various drawings indicate like elements unless the context requires otherwise.

DETAILED DESCRIPTION

The present invention encompasses beamforming transceiver system architectures and methods that enable linearizing beamforming transmissions.

Figure 1B:
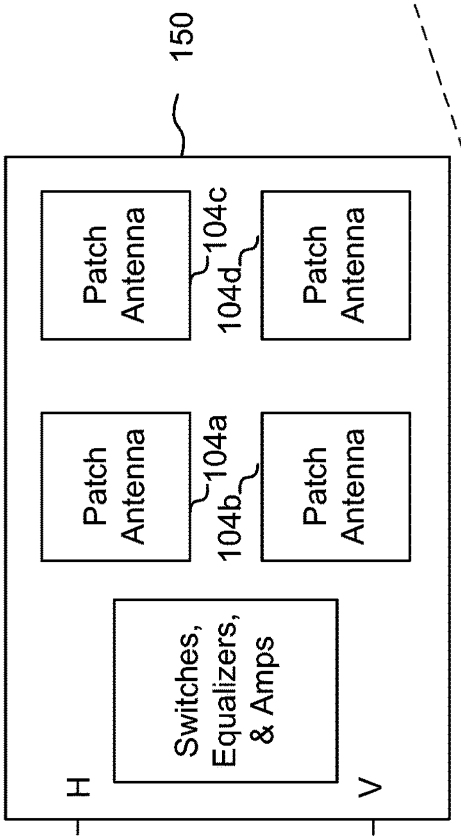
FIG. 1B is a simplified symbolic block diagram of a beamforming transceiver "tile" representing the IC and four patch antennas of FIG. 1A.
Figure 2A:
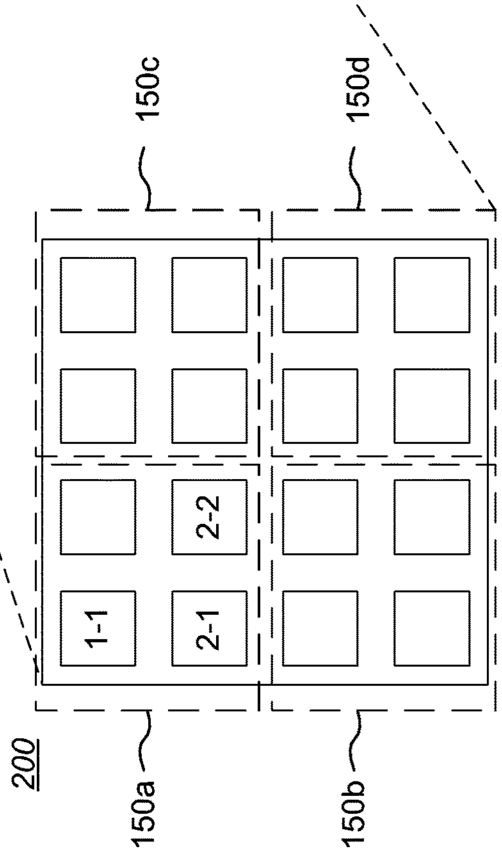
FIG. 2A is a block diagram of an array of four beamforming transceivers tiles like the tile shown in FIG. 1B.

In a beamforming system, linearity degradation at higher transmit power can lead to power supply inefficiency and associated thermal management issues. Another issue with conventional beamforming systems is that the location of a PA within an array affects its performance. For example, FIG. 2A is a block diagram of an array 200 of four beamforming transceivers tiles 150*a*-150*d* like the 4-antenna tile 150 shown in FIG. 1B. In this configuration, the PAs of each tile 150*a*-150*d* can be positioned near an edge of the array 200 and thus in general should experience the same thermal environment. However, the beamforming transceivers tiles 150*a*-150*d* may experience different electrical loads due to antenna interaction and possible assembly/module differences. For example, patch antenna 1-1 is adjacent to only 3 other patch antennas, patch antenna 2-1 is adjacent to 5 other patch antennas, and patch antenna 2-2 is surrounded by 8 other patch antennas.

Figure 2B:
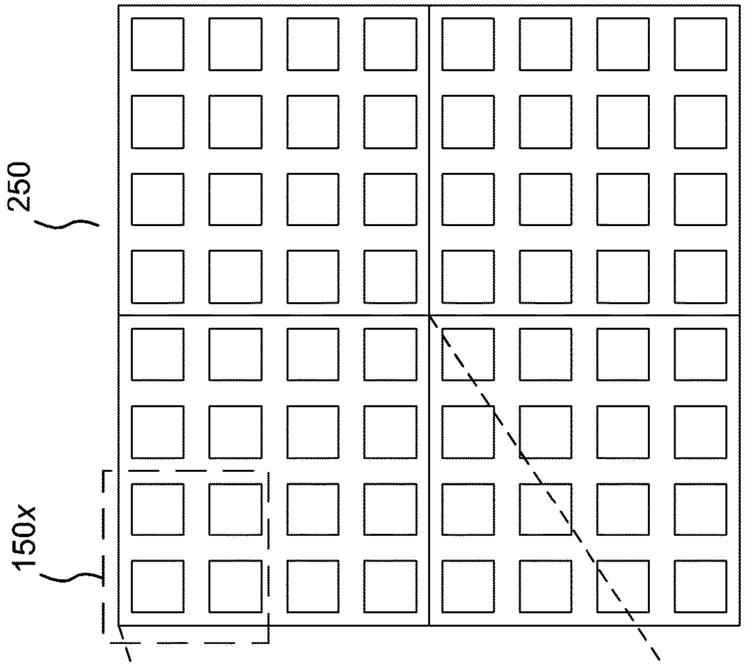
FIG. 2B is an array of 16 beamforming transceivers tiles of the type shown in FIG. 1B.

Furthermore, the thermal environment may affect the performance of beamforming transceivers tiles in larger arrays. For example, FIG. 2B is an array 250 of 16 beamforming 4-antenna transceivers tiles 150*x* of the type shown in FIG. 1B. In this configuration, only some of tile PAs can be positioned near an edge of the array 250 to generally experience the same thermal environment; the gray-colored inner tiles will generally run hotter, which can affect PA gain and linearity.

Non-linearities in the transmission path of a beamforming tile are dominated by the power amplifiers and ultimately limit performance at system level. Different methods may be employed to maintain linearity and to address the problems noted above. For example, linearity degradation may be compensated by independent modification of power rail voltages, adjusting individual PA drain current and/or cascode gate bias voltages, adjustment of various controls within a beamforming system IC (e.g., control signals associated with PA bias), and/or use of digital pre-distortion (DPD), where a baseband signal or an RF input signal can be modified to compensate for non-linearities later in the system (predominantly mostly within one or more PAs).

Conventionally, attempts to optimize linearity settings to accommodate different application environments for a beamforming tile (IC and patch antennas) have been based on one-time programming of each PA within the tile with "best average settings" statistically derived from measurements on many test units over a range of conditions (e.g., power, voltage, temperature). Although using "best average settings" determined for one PA of a beamforming tile in isolation will not be a bad choice, the full antenna array system as a whole may not perform as well as it might.

What is important for optimization of a full antenna array system (e.g., patch antenna arrays in, for example, 2×2, 4×4, 8×8, etc. configurations) is the linearity of the system as a whole, meaning the linearity of the combined transmit signal from all active transmission paths, which is the effective signal that gets externally transmitted by a transceiver system.

It is possible to adjust the settings of different transceiver transmission parameters affecting linearity if the performance of each transmission signal path is known in advance—that is, measured characteristics of transmitted signals may be used to adjust (calibrate) transmission parameter values. One aspect of the present invention includes beamforming transceiver systems that can provide practical diagnostic information to allow "live-in-system" sensitivity analysis of supply rails, internal control lines, and more. Another aspect of the present invention includes beamforming transceiver systems that permit "array level" DPD correction to be implemented. In essence, a transmit-side signal of a first polarity is sampled and provided through a feedback path utilizing sections of the second polarity receive-side circuitry to a single node for subsequent analysis. Thus, all feedback paths may be aggregated to replicate the transmitted signal seen by a user such that the replicated signals are conveyed back as a "virtual beam" to a single node for analysis and further action. Analysis circuitry may set parameter values within a digital pre-distortion circuit and/or control signals for directing the control of various weights and parameter values, including voltages for the power rails of a beamforming transceiver IC, adjustments to individual power amplifier drain current and/or cascode gate bias voltage, adjustment of beam weights, adjustment of various other controls within the IC, etc. It is expected that the novel features should also improve calibration efficiency in production, hence providing cost savings.

Adjustment of beam weights based on analysis of the return virtual beam is particularly useful. For example, beam weight adjustments may be used to compensate for differences in the path lengths between each PA and associated antennas that fall outside the feedback loop, as well as to compensate for parasitic effects (capacitances, inductances, resistances) in the circuit. Thus, the RX feedback path weightings do not necessarily need to exactly negate the TX path weightings. Beam weight adjustments also may be used to compensate for some circuit isolation issues in the TX path to RX feedback path to DPD circuit. Use of beam weight adjustments also enables the possibility of using beam weights to deliberately add an imperfection in the RX feedback path to the DPD circuit, so that the DPD circuit is forced to make a compensation. For example, adding an artificial null or a peak in the RX feedback path to the DPD circuit would force the DPD loop to create the opposite signal on the TX side, which may be useful, for example, for diagnostic uses.

Figure 3A:
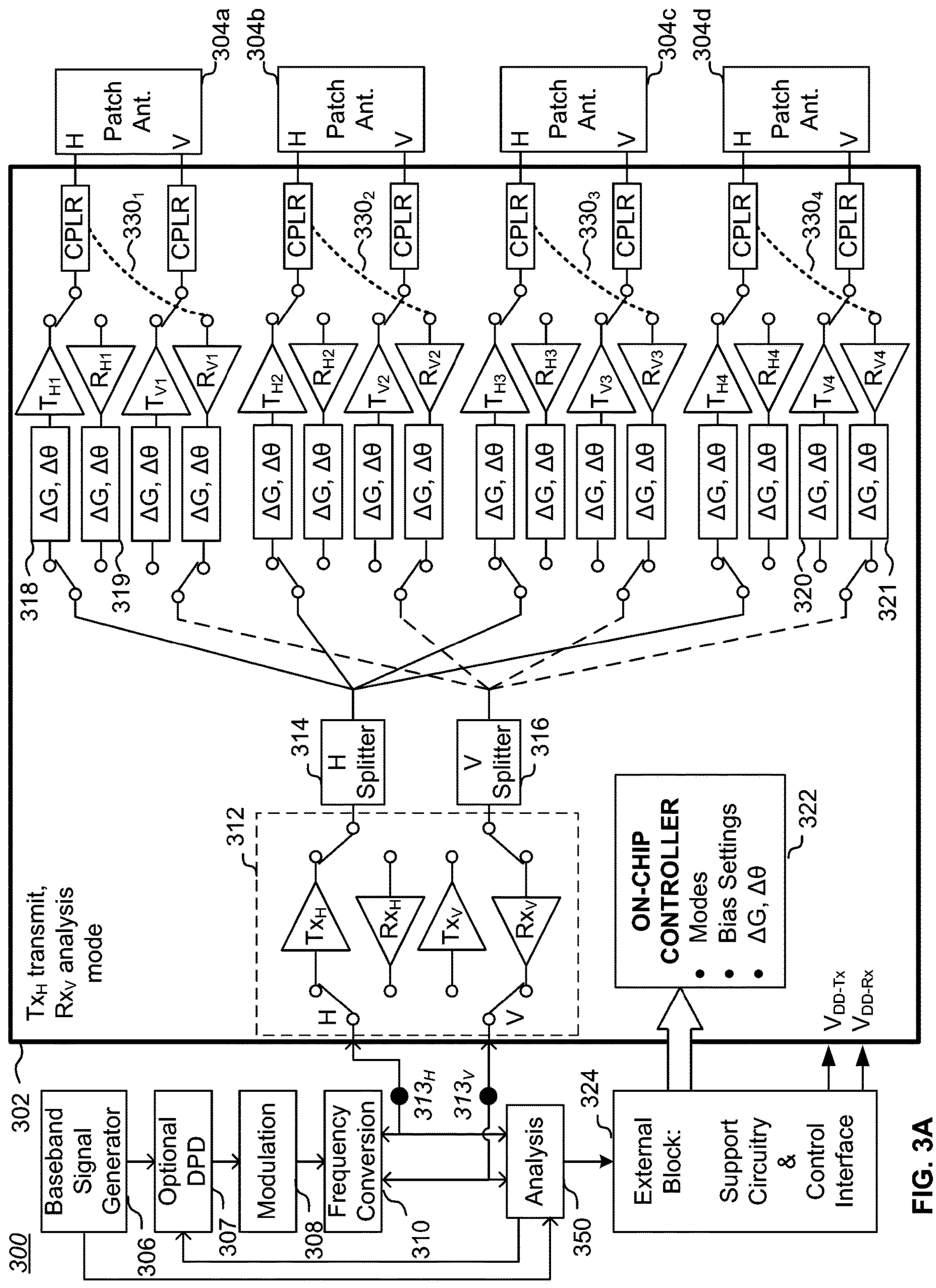
FIG. 3A is a block diagram of a first improved transceiver system that includes an IC that supports four external patch antennas and provides "full-path" horizontally polarized diagnostic information in a first state.
Figure 3B:
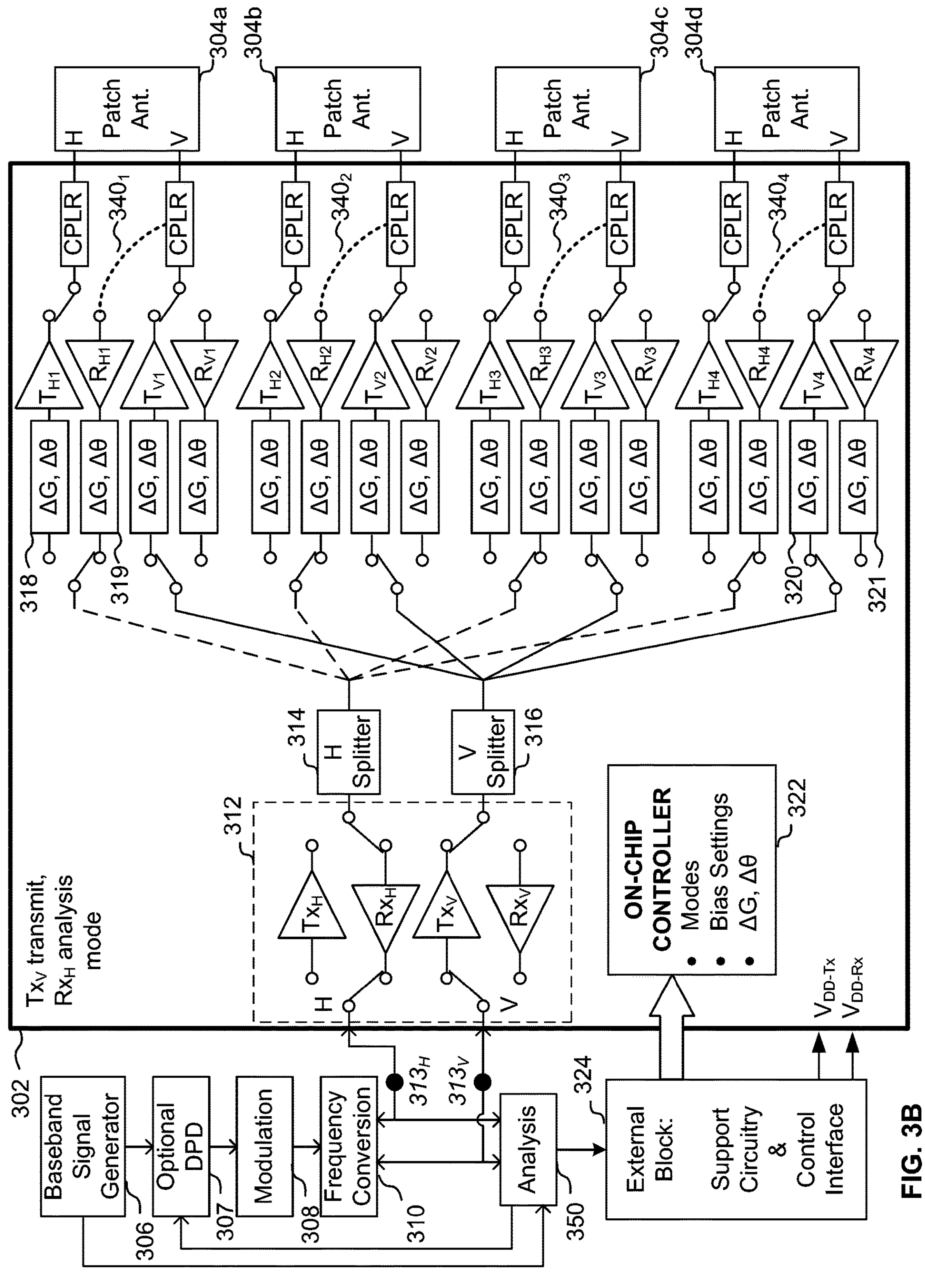
FIG. 3B is a block diagram of the first improved transceiver system where the IC provides "full-path" vertically polarized diagnostic information in a second state.

FIG. 3A is a block diagram of a first improved transceiver system 300 that includes an IC 302 that supports four external patch antennas 304*a*-304*d* and provides "full-path" horizontally polarized diagnostic information in a first state. FIG. 3B is a block diagram of the first improved transceiver system 300 where the IC 302 provides "full-path" vertically polarized diagnostic information in a second state.

In the illustrated example, an external baseband signal generator 306 provides a baseband signal to an optional DPD element 307, which pre-distorts the baseband signal to compensate for non-linearities later in the transceiver system 300. The DPD element 307 may be implemented in circuitry and/or software, in known fashion. The pre-distorted output of the DPD element 307 is coupled to a modulation circuit 308, which outputs a modulated signal. A frequency conversion circuit 310 generates horizontally and vertically polarized RF signals from the modulated signal, which are coupled to input/output ports H, V of the IC 302. An amplifier 312 includes both horizontal (H) and vertical (V) polarization power amplifiers (PAS) $Tx_H$, $Tx_V$ and low-noise amplifiers (LNAs) $Tx_H$, $Rx_V$ that may be selectively coupled to a corresponding input/output port H, V and a corresponding H-splitter 314 or V-splitter 316.

H-polarized RF signals pass through the H-splitter 314 to and from blocks of selectable transmission-side PGCEs 318 and reception-side PGCEs 319 (only one of each is labelled to avoid clutter). Similarly, V-polarized RF signals pass through the V-splitter 316 to and from blocks of selectable transmission-side PGCEs 320 and reception-side PGCEs 321 (only one of each is labelled to avoid clutter).

Each PGCE 318, 320 in a transmission path is coupled to a PA $T_{Hn}$ or $T_{Vn}$ (n=1-4 in this example) which in turn can be selectively coupled to a respective directional coupler CPLR. Each directional coupler CPLR may be, for example, a 20 dB broadside directional coupler, which splits off about 1% of the incident power to a coupled port while the rest of the incident power is applied to a corresponding patch antenna 304*a*-304*d*. In some embodiments, the small fraction of incident power from the coupled port of a directional coupler CPLR may be applied to a corresponding power detector block PD, as in FIG. 1A (the PD blocks are omitted in FIGS. 3A and 3B to avoid clutter). Each PGCE 319, 321 in a receive path is coupled to an LNA $R_{Hn}$ or $R_{Vn}$ (n=1-4 in this example) which in turn can be selectively coupled to a corresponding patch antenna 304*a*-304*d*.

The PGCEs 318-321 (blocks denoted as "ΔG, Δθ") can be individually set to "beam weights" (comprising a gain (attenuation) level and phase angle for received RF signals) under the control of an on-chip controller 322. The on-chip controller 322 can also set modes of operation (e.g., selecting between transmitting/receiving H and V polarities concurrently or individually, or frequency ranges, test and calibration modes, and/or coarse gain settings), and bias settings for the PAs and LNAs that affect amplifier gain, power capability, and/or linearity. An external block 324 provides support circuitry and a control interface, such as connection to a control bus (e.g., an SPI serial bus) and provision of power to power rails (e.g., $V_{DD\text{-}Tx}$ and $V_{DD\text{-}Rx}$) within the IC 302. In some embodiments, the external block 324 may contain envelope tracking (ET) circuitry and/or average power tracking (APT) circuitry.

Figure 1A:
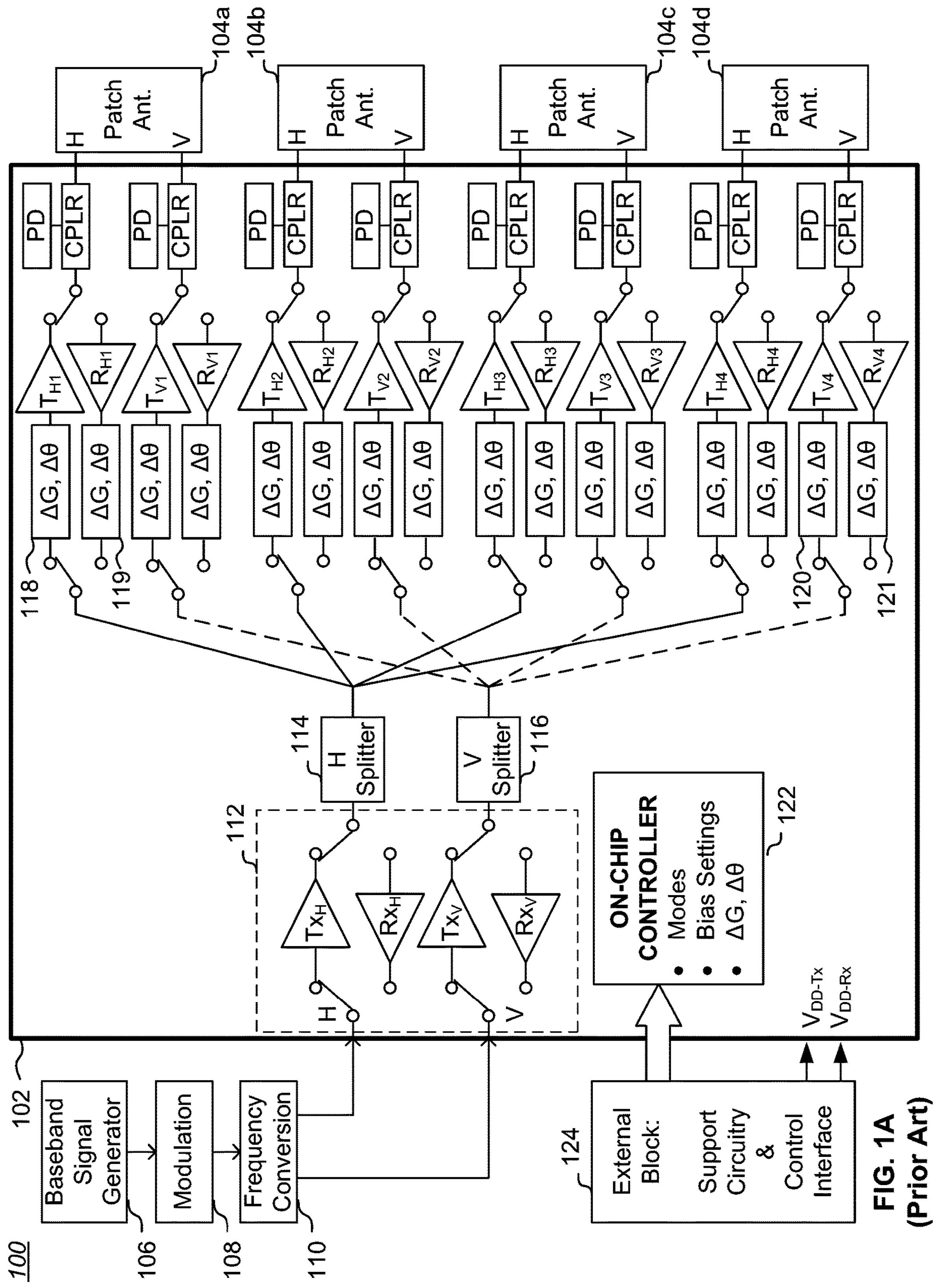
FIG. 1A (Prior Art)
FIG. 1A is a block diagram of one prior art transceiver system that includes an IC that supports four external patch antennas.

Up to this point, the IC 302 is very similar to IC 102 in FIG. 1A. However, in FIG. 3A, IC 302 includes transmitted signal feedback paths 330*n* (where n=1-4 in this example)

between the coupled port of a directional coupler CPLR for each H-polarized transmit-side PA $T_{Hn}$ and a corresponding V-polarized receive-side LNA $R_{Vn}$. For example, a small fraction of the incident power applied by H-polarized transmit-side PA $T_{H1}$ to its corresponding directional coupler CPLR may be connected back to V-polarized receive-side LNA $R_{V1}$ through transmitted signal feedback path 330$_1$. In some embodiments, a switch (not shown, but see FIG. 6A) may be placed within each transmitted signal feedback path 330*n* to allow selectable connection of a fractional feedback signal to a corresponding LNA.

Similarly, in FIG. 3B, IC 302 includes transmitted signal feedback paths 340*n* (where n=1-4 in this example) between the coupled port of a directional coupler CPLR for each V-polarized transmit-side PA $T_{Vn}$ and a corresponding H-polarized receive-side LNA $R_{Hn}$. For example, a small fraction of the incident power applied by V-polarized transmit-side PA $T_{V4}$ to its corresponding directional coupler CPLR may be connected back to H-polarized receive-side LNA $R_{V4}$ through transmitted signal feedback path 340$_4$. In some embodiments, a switch (not shown, but see FIG. 6B) may be placed within each transmitted signal feedback path 340*n* to allow selectable connection of a fractional feedback signal to a corresponding LNA.

The output of each LNA that receives a fractional feedback signal of one polarity from an associated transmitted signal feedback path 330*n*, 340*n* is modified by the beam weights of a corresponding receive-side PGCE 319, 321. The modified feedback signal is then coupled back through the opposite polarity splitter 314, 316, where, due to the settings of the various PGCEs, the modified feedback signal combines coherently with other feedback signals to become a single signal before being applied to the LNA $Rx_V$, $RX_H$ within the amplifier 312 and provided at a corresponding node 313$_H$, 313*V* as a "virtual beam" to an analysis circuit 350. In general, the analysis circuit 350 may include internal path switches that allow selecting a modified feedback signal as input while blocking the transmit-side signal from the frequency conversion circuit 310.

The analysis circuit 350 may perform any desired type of analysis and/or signal detection including (without limitation) power level detection, voltage level detection, spectral analysis, linearity analysis, VSWR detection, load mismatch detection, etc. The analysis circuit 350 may also be coupled to the baseband signal generator 306 and configured to compare a down-converted version of the received feedback signal to the original signal output by the baseband signal generator 306.

The output of the analysis circuit 350 also may be used to set parameter values within the DPD element 307 to pre-distort the signals applied to the IC 302, and/or may be applied as control signals to the external block 324. The external block 324 may use control signals from the analysis circuit 350 to set at least one operating parameter for the PAs and/or PGCEs, such as voltages for the power rails $V_{DD\text{-}Tx}$, $V_{DD\text{-}Rx}$, individual PA drain current and/or cascode gate bias voltage, beam weights, etc. Note that aggregation of feedback signals from all of the transmit-side channels as a "virtual beam" to a single feedback node enables analysis and correction of non-linearities of the transceiver system 300 as a whole, an important aspect of the present invention.

Referring again to FIG. 3A, as an example of a first mode of operation of the IC 302, a modulated RF signal is applied to the H-port of the IC 302 and amplified by PA $Tx_H$. The amplified signal is split four ways by the H-splitter 314 and applied to the transmission-side PGCEs 318 associated with PAS $T_{H1}$-$T_{H4}$ (see solid connection lines). Each of the PGCEs 318 would in general apply different programmed beam weights (ΔG, Δθ) to the split amplified signal from the H-splitter 314 to form part of a transmit beam. At the corresponding patch antenna 304*a*-304*d*, each transmitted signal will have accumulated some non-linearities (slightly different in each path). The signal transmitted by the patch antennas 304*a*-304*d* includes the combined non-linearity of all H-polarity transmit paths.

A small fraction of the incident power applied by the H-polarized transmit-side PAs $T_{H1}$-$T_{H4}$ to their corresponding directional coupler CPLR is connected as feedback signals to the V-polarized receive-side LNAs $R_{V1}$-$R_{V4}$ through corresponding transmitted signal feedback paths 330$_1$-330$_4$. The PGCEs 321 corresponding to LNAs $R_{V1}$-$R_{V4}$ would in general apply the compensating beam weights (ΔG, Δθ) to the feedback signals corresponding to the beam weights that were applied to the transmit-side signals, essentially nullifying the effect of the transmit-side beam weights. For example, assume that ΔG is constant and that Δθ for the PGCEs 318 for the transmit-side path are 0, 10, 20, and 30 degrees respectively. The Δθ for the PGCEs 321 for the receive-side path would then be 0, −10, −20, and −30 degrees (plus any fixed phase associated with nulling other accumulated phase/delay occurring before the correction point). However, the receive-side weightings do not necessarily need to exactly negate the transmit-side weightings, since beam weight adjustments may be used to compensate for differences in the path lengths between each PA and associated antennas that fall outside the feedback loop, to compensate for parasitic effects in the circuit, and/or to compensate for any TX path to RX feedback path isolation issues. The compensated feedback signals are then coupled to the V-splitter 316 (see dashed connection lines) to create a coherently-combined single feedback signal which is amplified by the $Rx_V$ LNA and coupled to the analysis circuit 350. Alternatively, the coherently-combined single feedback signal may be made available through a sense pad or pin (not shown) for connection to external test equipment (e.g., during factory testing).

Referring now to FIG. 3B, as an example of a second mode of operation of the IC 302, a modulated RF signal is applied to the V-port of the IC 302 and amplified by PA $Tx_V$. The amplified signal is split four ways by the V-splitter 316 and applied to the transmission-side PGCEs 320 associated with PAs $T_{V1}$-$T_{V4}$ (see solid connection lines). Each of the PGCEs 320 would in general apply different programmed beam weights (ΔG, Δθ) to the split amplified signal from the V-splitter 316 to form part of a transmit beam. At the corresponding patch antenna 304*a*-304*d*, each transmitted signal will have accumulated some non-linearities (slightly different in each path). The signal transmitted by the patch antennas 304*a*-304*d* includes the combined non-linearity of all V-polarity transmit paths.

A small fraction of the incident power applied by the V-polarized transmit-side PAS $T_{V1}$-$T_{V4}$ to their corresponding directional coupler CPLR is connected as feedback signals to the H-polarized receive-side LNAs $R_{H1}$-$R_{H4}$ through corresponding transmitted signal feedback paths 340$_1$-340$_4$. The PGCEs 319 corresponding to LNAs $R_{H1}$-$R_{H4}$ would in general apply the compensating beam weights (ΔG, Δθ) to the feedback signals corresponding to the beam weights that were applied to the transmit-side signals, essentially nullifying the effect of the transmit-side beam weights (although, again, the RX feedback path weightings do not necessarily need to exactly negate the TX path weightings). The compensated feedback signals are then coupled to the H-splitter 314 (see dashed connection lines) to create a coherently-combined single feedback signal which is amplified by the $Rx_H$ LNA and coupled to the analysis circuit 350.

Provided that the return receive-side feedback path is fairly linear (low power level), the coherently-combined single feedback virtual beam signal will be closely representative of the transmit signal and its combined non-linearities. Note that the IC 302 as shown does require that transmission be limited to one transmit-side path polarity (H or V) at a time, since the receive-side path of the other polarity is used to convey the feedback signal to the analysis circuit 350. Thus, for example, a calibration transmission on the H-polarity transmit-side paths can generate a combined feedback signal through the V-polarity receiver-side paths to the DPD circuit 307 as a virtual beam, thereby allowing pre-distorted beam weightings to be determined and applied to the various PGCEs of the IC 302. Similarly, a calibration transmission on the V-polarity transmit-side paths can generate a combined feedback signal through the H-polarity receiver-side paths to the DPD circuit 307 as a virtual beam, thereby allowing pre-distorted beam weightings to be determined and applied to the various PGCEs of the IC 302. In effect, the entire array is treated as a single PA. Another beneficial characteristic of embodiments of the invention is that they can make use of a significant amount of existing circuitry to convey sampled feedback signals from the point of connection to a patch antenna back to an analysis circuit.

Figure 3C:
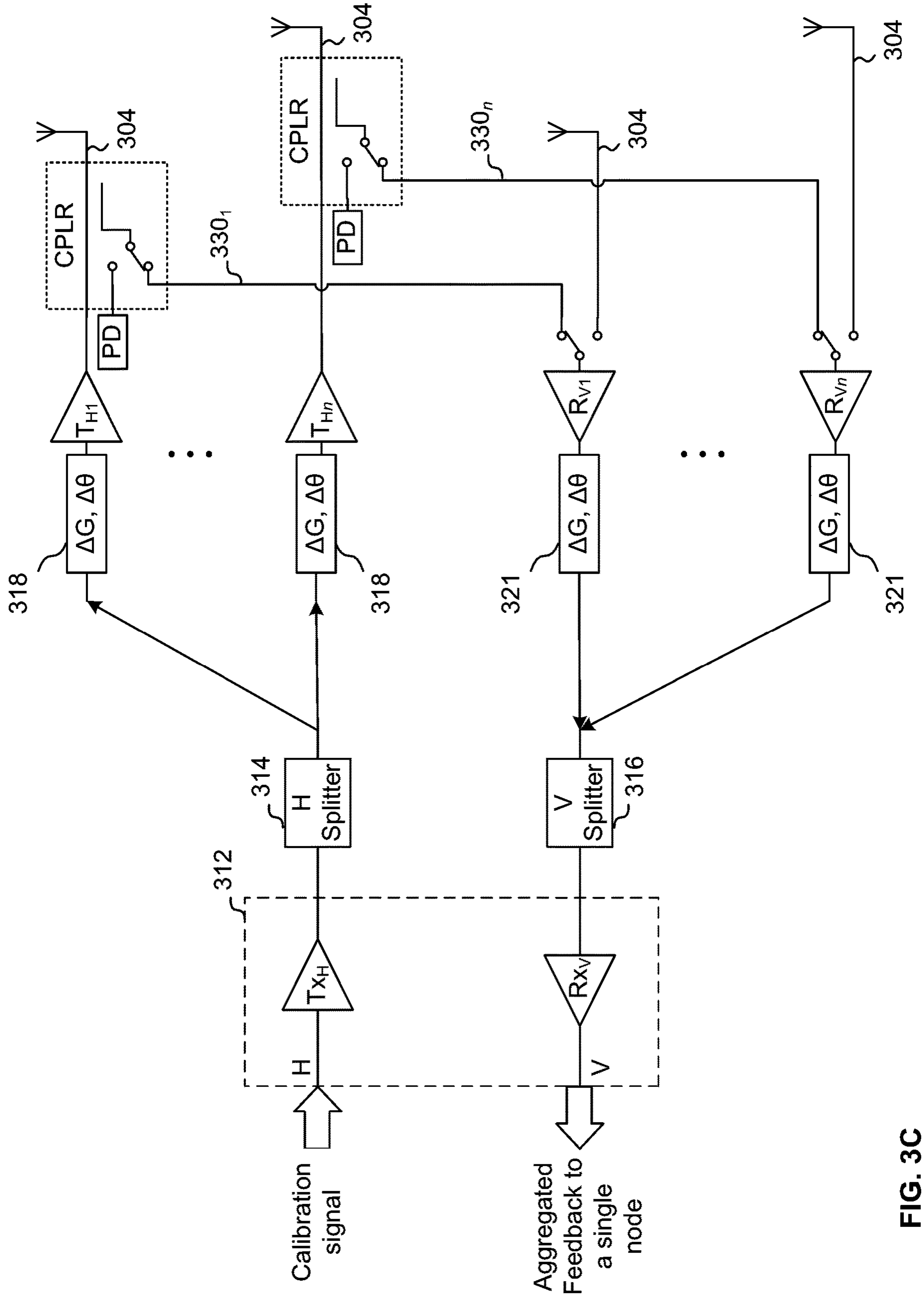
FIG. 3C is a simplified version of FIG. 3A re-arranged to emphasize the transmission signal path and feedback paths.

FIG. 3C is a simplified version of FIG. 3A re-arranged to emphasize the transmission signal path and feedback paths. A calibration signal applied to port H of the amplifier 312 is conveyed through a horizontally polarized PA $Tx_H$, the H-splitter 314, a set of transmission-side PGCEs 318 and corresponding PA's $T_{H1}$ . . . . $T_{Hn}$ to corresponding patch antennas 304. Transmitted signal feedback paths $\mathbf{330}_1$ . . . $\mathbf{330}_n$ from directional couplers CPLR for each H-polarized transmit-side $T_{H1}$ . . . $T_{Hn}$ convey a feedback signal through corresponding V-polarized receive-side LNA $R_{V1}$ . . . $R_{Vn}$. reception-side PGCEs 321, the V-splitter 316, and LNA $Rx_V$ to port V of the amplifier 312, thus providing an aggregated feedback signal to a single node. A similar circuit configuration with reversed polarity corresponds to FIG. 3B.

A primary expected use of the receive-side path feedback signal is to support digital pre-distortion. Here, the aggregate feedback signal is analyzed and DPD weights (provided to the DPD element 307) are adjusted to linearize the system as whole. Once one transmit-side polarity (e.g., H) is linearized, the system can be re-configured to linearize the other transmit-side polarity (e.g., V).

Even in configurations that lack the optional DPD element 307, it would be possible to get a modest "free" increase in performance though analysis of the aggregate feedback signal and using the results of the analysis to modify the power amplifier settings within the IC 302, including setting drain current, cascode gate bias voltage control, and any local linearizer parameter value within the PAs.

Figures 4A, 4B:
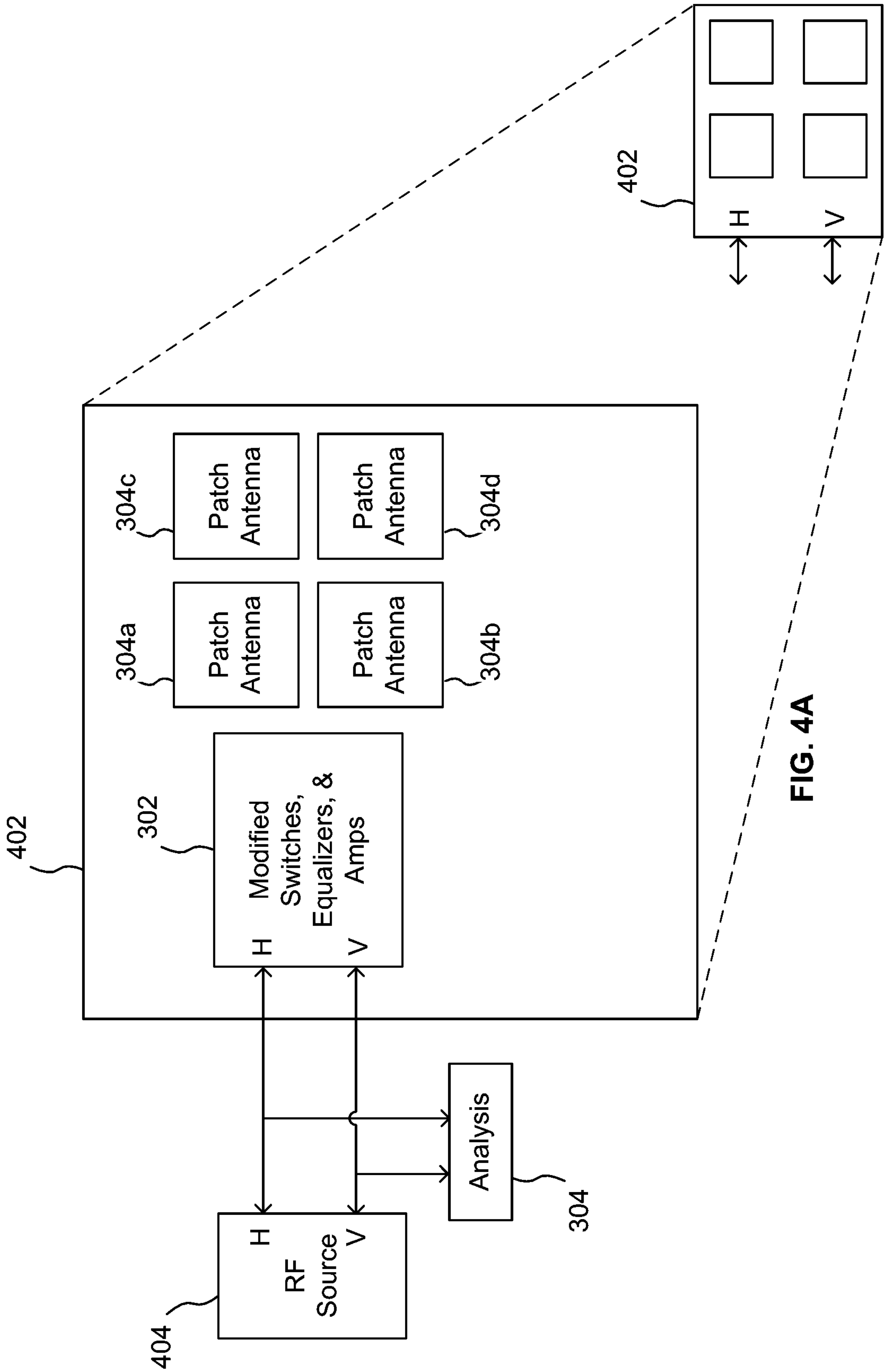
FIG. 4A is a simplified symbolic block diagram of FIGS. 3A and 3B in which a beamforming transceiver "tile" includes the IC and four patch antennas, and an "RF source" represents the external components described above for generating the H and V inputs to the IC.
FIG. 4B is an even more simplified symbol for the transceiver tile of FIG. 4A.

FIG. 4A is a simplified symbolic block diagram of FIGS. 3A and 3B in which a beamforming transceiver "tile" 402 includes the IC 302 and four patch antennas 304*a*-304*d*, and an "RF source" 404 represents the external components described above for generating the H and V inputs to the IC 302. FIG. 4B is an even more simplified symbol for the transceiver tile 402 of FIG. 4A.

Figure 5:
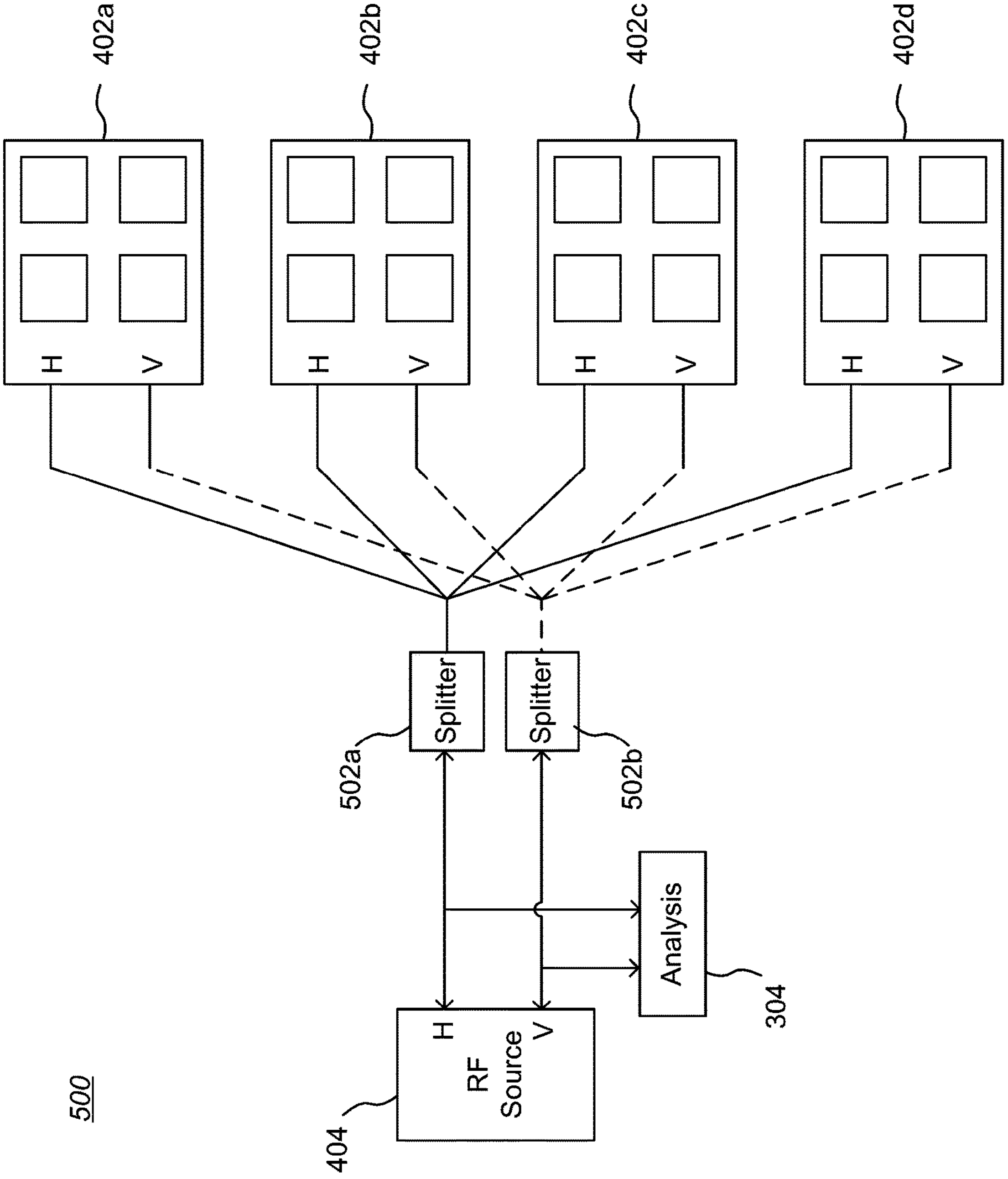
FIG. 5 is a block diagram of an array of four beamforming transceivers tiles like the tile shown in FIG. 4B.

FIG. 5 is a block diagram of an array 500 of four beamforming transceivers tiles 402*a*-402*d* like the tile 402 shown in FIG. 4B. Typically, the tiles 402*a*-402*d* would be configured as a 2×2 array, but the 1×4 array shown may be useful in some applications. FIG. 5 illustrates that when combining multiple tiles 402*x*, additional splitters 502*a*, 502*b* may be required. As should be appreciated, even larger arrays of tiles 402*x* may be created, such as the 4×4 configuration shown in FIG. 2B. An array of 16 tiles 402*x* would result in an 8×8 array of patch antennas 304*a*-304*d* (64 total). However, it remains possible to use the novel feedback circuitry and method successfully as there is still a single transmit-side injection node and a single receive-side feedback signal node.

Providing power amplifiers can be individually enabled, it may be useful to have only a subset of an array transmit at once to investigate how PAs in different locations differ in their non-linear contributions compared to other PAS (e.g., "corner" or "edge" PAs versus "center" PAs). In this way, a set of modified weights for individual PAs (e.g., drain current, bias voltage, power rail voltage, etc.), in combination with digital pre-distortion, may be determined that would provide the best overall performance for the improved transceiver system 300. Note also that different PA settings and DPD parameter values may be determined for different conditions, such as different modulation schemes, bandwidths, and/or power levels. There is also the possibility to use different PA settings for different beam steering angles.

Figure 6A:
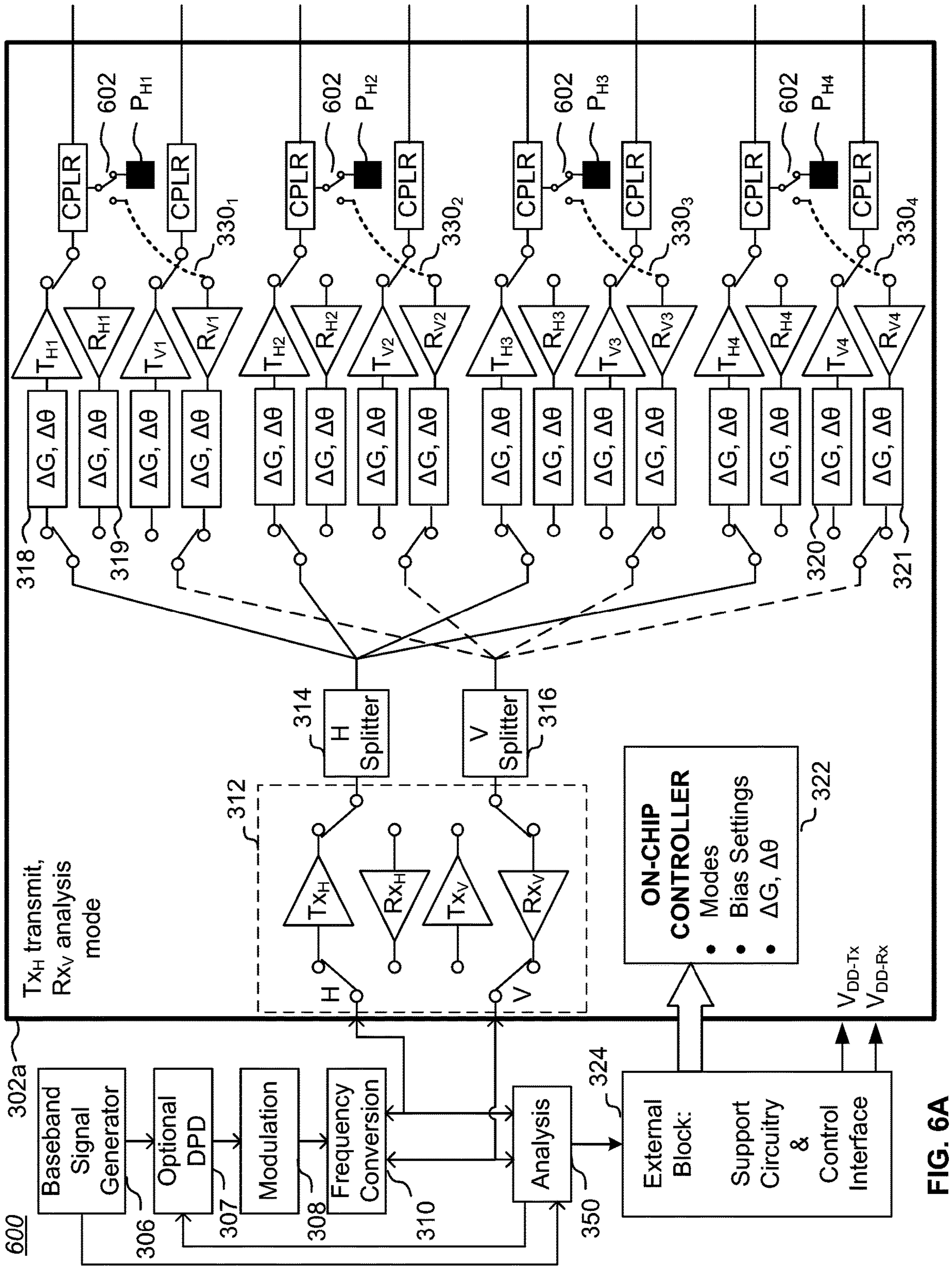
FIG. 6A is a block diagram of a second improved transceiver system that includes an IC that supports four external patch antennas and provides two structures for monitoring "full-path" horizontally polarized diagnostic information in a first state.
Figure 6B:
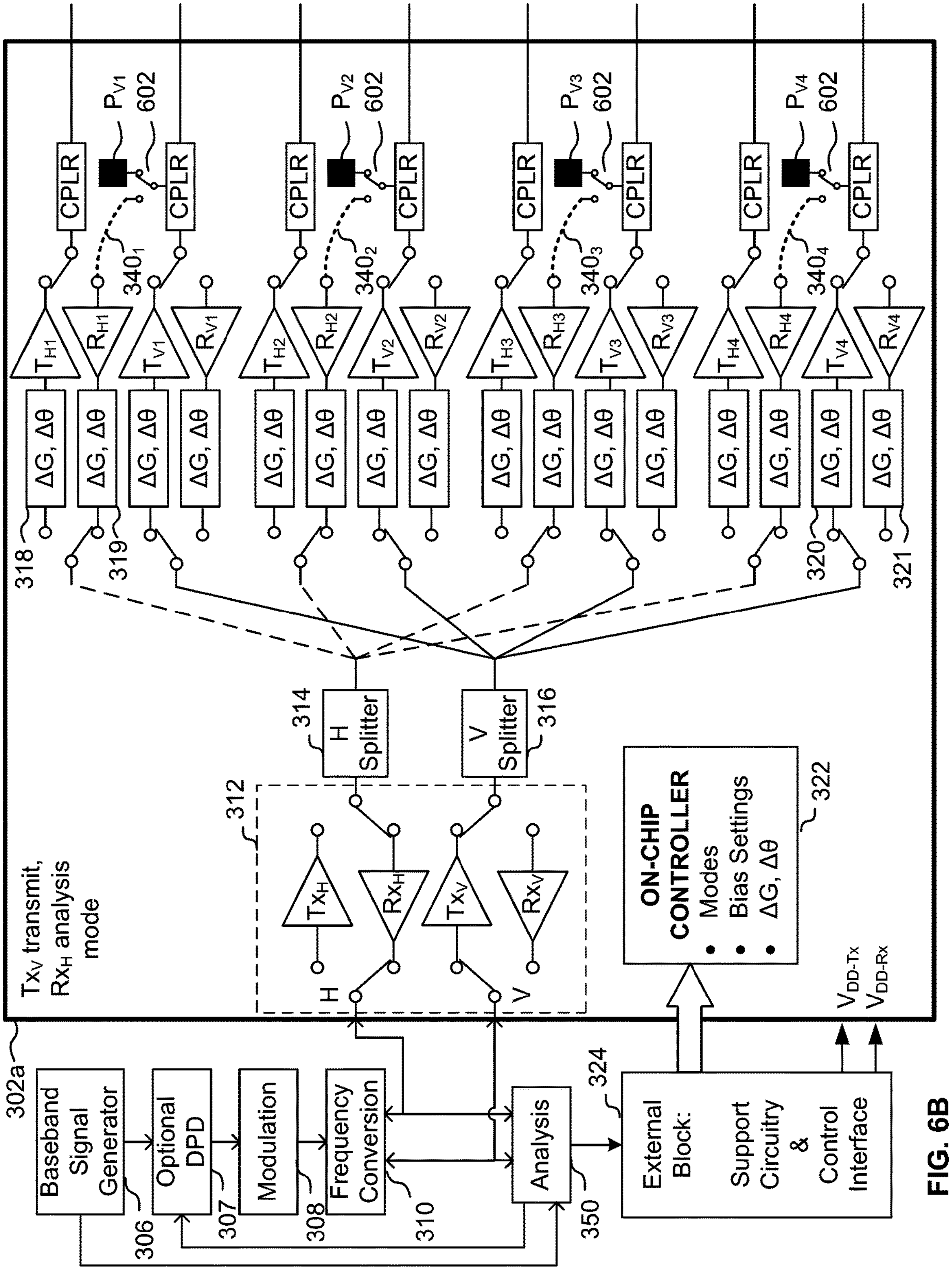
FIG. 6B is a block diagram of the second improved transceiver system where the IC provides two structures for monitoring "full-path" vertically polarized diagnostic information in a second state.

In the configurations of the IC 302 shown in FIGS. 3A and 3B, although the H and V polarizations should be reasonably isolated, there may be some interaction. Accordingly, it may be useful to have a second configuration for evaluating the feedback signals from the directional couplers CPLR. For example, FIG. 6A is a block diagram of a second improved transceiver system 600 that includes an IC 302*a* that supports four external patch antennas 304*a*-304*d* and provides two structures for monitoring "full-path" horizontally polarized diagnostic information in a first state. FIG. 6B is a block diagram of the second improved transceiver system 600 where the IC 302*a* provides two structures for monitoring "full-path" vertically polarized diagnostic information in a second state. In both figures, patch antennas have been omitted to avoid clutter. Similar in most respects to respective FIGS. 3A and 3B, switches 602 have been added to each directional coupler CPLR coupled port output to allow a sampled transmission signal to be connected either to a respective transmitted signal feedback path 330*n*, 340*n*, or to an associated sense pad or pin $P_{Hn}$ or $P_{Vn}$.

Providing the sense pad/pins $P_{Hn}$, $P_{Vn}$ allows analysis by external test equipment (e.g., during factory testing) and also enables analysis when on-chip feedback analysis through the transmitted signal feedback paths 330*n*, 340*n* is not available, such as when both polarizations, H and V, are transmitting at the same time. This configuration also permits whole-chip operation at the point of analysis, so all H and V transmission interactions may be included. Furthermore, the IC 600 can be operated at over a range of temperatures, allowing temperature-dependent component variations affecting linearity to be explored.

Figure 7A:
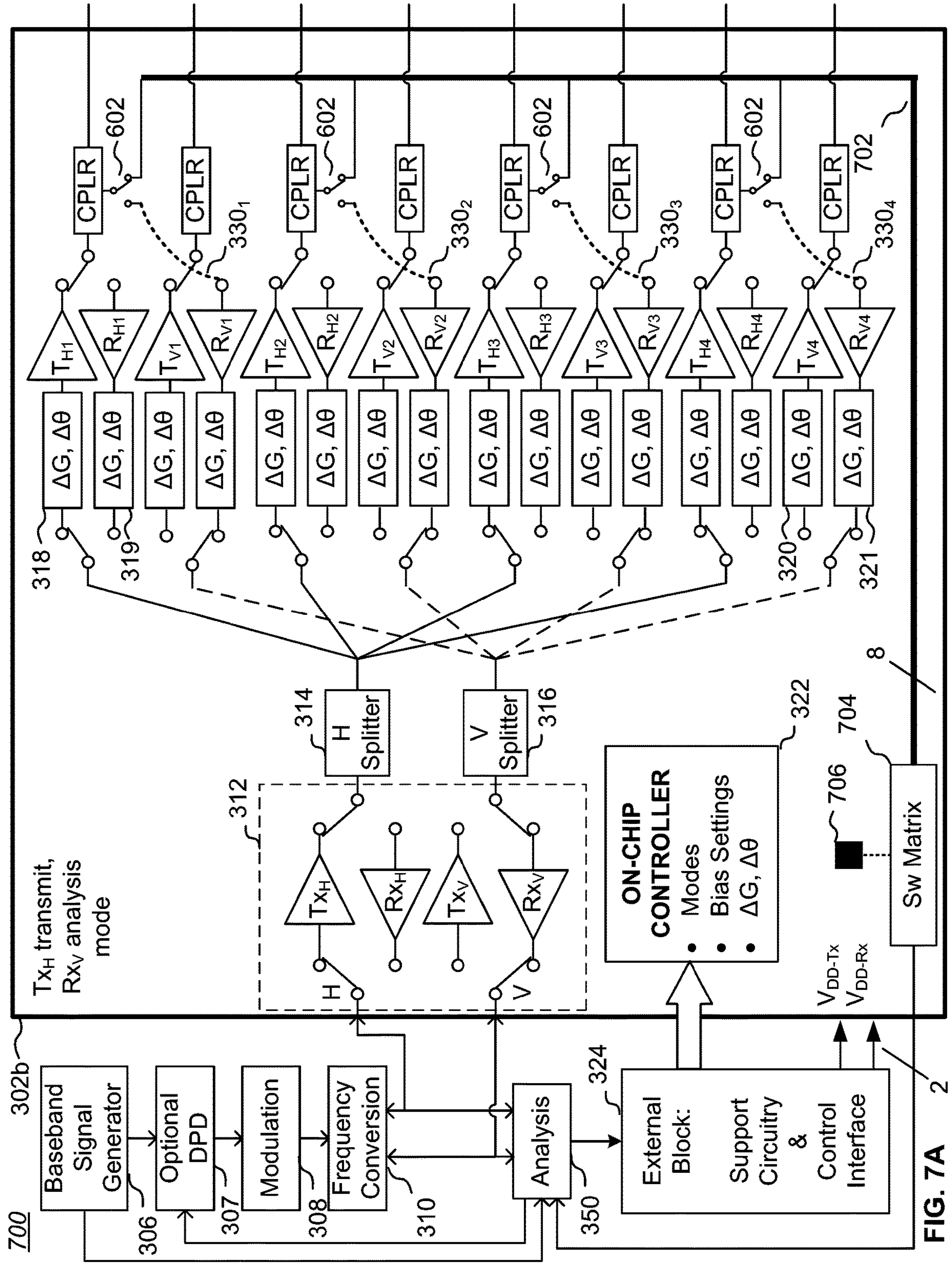
FIG. 7A is a block diagram of a third improved transceiver system that includes an IC that supports four external patch antennas and provides two structures for monitoring "full-path" horizontally polarized diagnostic information in a first state.
Figure 7B:
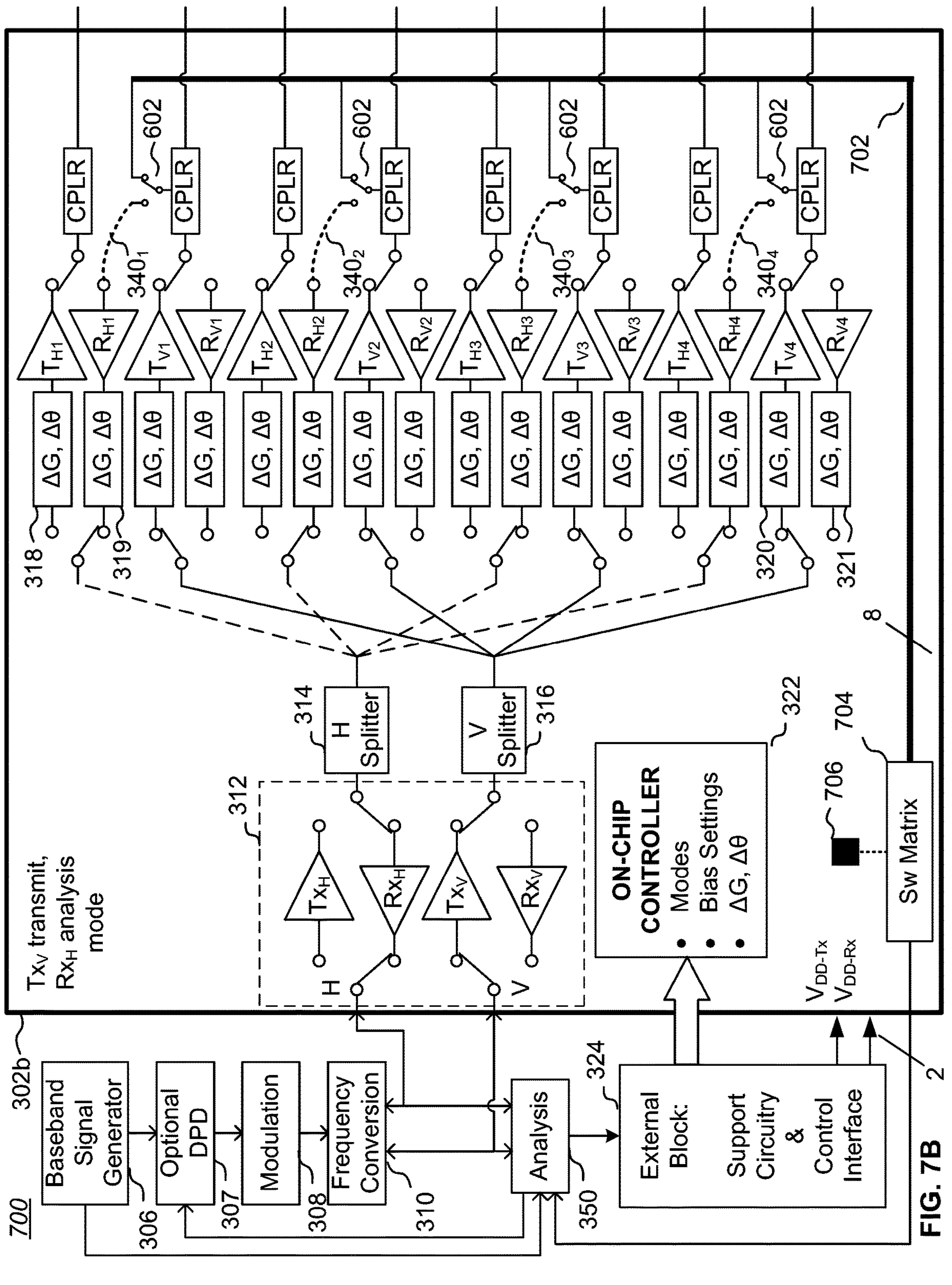
FIG. 7B is a block diagram of the third improved transceiver system where the IC provides two structures for monitoring "full-path" vertically polarized diagnostic information in a second state.

FIG. 7A is a block diagram of a third improved transceiver system 700 that includes an IC 302*b* that supports four external patch antennas 304*a*-304*d* and provides two structures for monitoring "full-path" horizontally polarized diagnostic information in a first state. FIG. 7B is a block diagram of the third improved transceiver system 700 where the IC 302*b* provides two structures for monitoring "full-path" vertically polarized diagnostic information in a second state. In both figures, patch antennas have been omitted to avoid clutter.

Similar in most respects to respective FIGS. 6A and 6B, the switches 602 connected to each directional coupler CPLR coupled port output allow a sampled transmission signal to be connected either to a respective transmitted signal feedback path 330*n*, 340*n*, or to a conductor of a bus 702. The bus 702, shown as having 8 lanes in this example, connects the feedback signals from each transmission path to a switch matrix 704 configured to reduce the number of lanes to 2 (or even 1) output lane. The output of the switch matrix 704 may be coupled to the analysis circuit 350 and/or to one or two sense pad or pins 706 (one is shown in this example). The configuration illustrated in FIGS. 7A and 7B reduces the pin/pad count compared to the configuration of FIGS. 6A and 6B while offering the same benefits, including enabling analysis when on-chip feedback analysis through the transmitted signal feedback paths 330*n*, 340*n* is not available (e.g., when both polarizations, H and V, are transmitting at the same time), whole-chip operation at the point of analysis, and allowing temperature-dependent component variations affecting linearity to be explored.

For the embodiments shown in FIGS. 6A, 6B, 7A, and 7B, if a sampled transmission signal is directly connected to external test equipment or to the analysis circuit 350, then the feedback signal no longer passes through a reception-side PGCE 319, 321. Accordingly, a correction may be necessary in some cases before analysis to effectively nullify the effect of the transmit-side beam weights.

Note that FIGS. 3A, 3B, 6A, 6B, 7A, and 7B simplistically show single-pole, double-throw (SPDT) switches to make the various connections. However, other switch types and techniques may be used. For example, reflections in a hybrid coupler may be used to achieve the same effect. Note also that the transmitted signal feedback paths 330*n*, 340*n*, while shown connected to the input of respective LNAs (e.g., $R_{V1}$-$R_{V4}$ in FIG. 3A and $R_{H1}$-$R_{H4}$ in FIG. 3B), may instead be connected to any portion of the circuit path from an LNA input to the associated PGCE 319, 321 (i.e., the feedback signal does not need to pass through the full LNA chain).

The embodiments of the invention described above provide a "wired" method for analyzing the linearity of a transmit antenna array and enabling linearizing such an array, which provides a great simplification against Over-the-Air (OTA) methods. However, embodiments of the invention may be used in conjunction with OTA measurements to provide further corroboration of linearity measurements and/or corrective action with respect to linearity.

Overall benefits of beamforming transmission systems in accordance with the invention include: straightforward linearization implementations using on-chip controls, supply rail changes, and/or DPD through analysis of a single feedback signal; array-level linearity correction as a function of a single feedback signal; improved power consumption due to linearity corrections; case of thermal management; negligible impact on system integration; the ability to optimize individual power amplifiers without needing a dedicated pin or pad per amplifier and a complex printed circuit board (PCB) layout; provision of a range of diagnostics to support both IC and antenna understanding and improvements; and potential simplification to production calibration and hence reduced costs.

Circuits and devices in accordance with the present invention may be used alone or in combination with other components, circuits, and devices. Embodiments of the present invention may be fabricated as integrated circuits (ICs), which may be encased in IC packages and/or in modules for case of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end-product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 8:
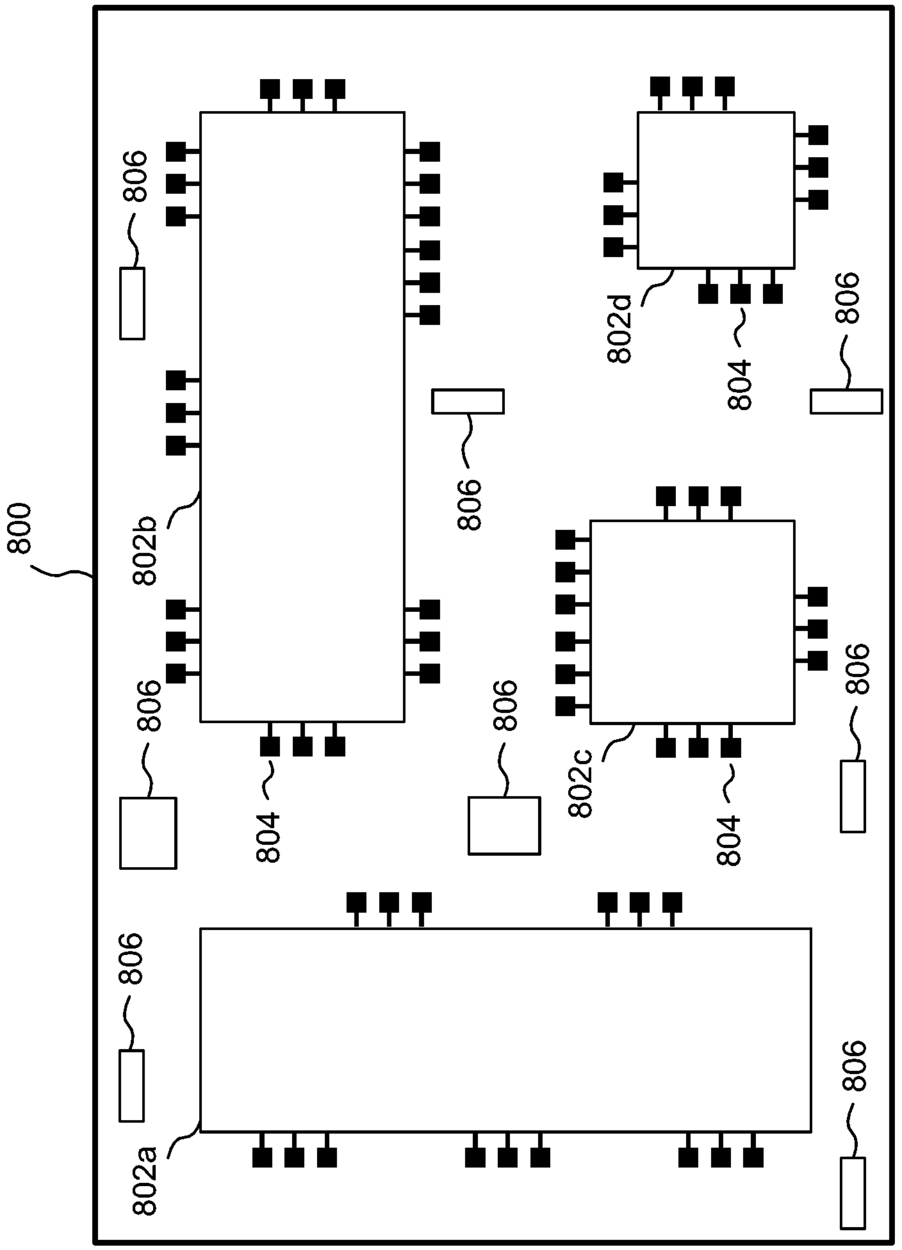
FIG. 8 is a top plan view of a substrate that may be, for example, a printed circuit board or chip module substrate (e.g., a thin-film tile).

As one example of further integration of embodiments of the present invention with other components, FIG. 8 is a top plan view of a substrate 800 that may be, for example, a printed circuit board or chip module substrate (e.g., a thin-film tile). In the illustrated example, the substrate 800 includes multiple ICs 802*a*-802*d* having terminal pads 804 which would be interconnected by conductive vias and/or traces on and/or within the substrate 800 or on the opposite (back) surface of the substrate 800 (to avoid clutter, the surface conductive traces are not shown and not all terminal pads are labelled). The ICs 802*a*-802*d* may embody, for example, signal switches, active and/or passive filters, amplifiers (including one or more LNAs), and other circuitry. For example, IC 802*b* may incorporate one or more instances of a beamforming transceiver like the ICs shown in FIGS. 3A-3B, 6A-6B, and 7A-7B.

The substrate 800 may also include one or more passive devices 806 embedded in, formed on, and/or affixed to the substrate 800. While shown as generic rectangles, the passive devices 806 may be, for example, filters, capacitors, inductors, transmission lines, resistors, antennae elements, transducers (including, for example, MEMS-based transducers, such as accelerometers, gyroscopes, microphones, pressure sensors, etc.), batteries, etc., interconnected by conductive traces on or in the substrate 800 to other passive devices 806 and/or the individual ICs 802*a*-802*d*. The front or back surface of the substrate 800 may be used as a location for the formation of other structures.

Embodiments of the present invention are useful in a wide variety of larger radio frequency (RF) circuits and systems for performing a range of functions, including (but not limited to) impedance matching circuits, RF power amplifiers, RF low-noise amplifiers (LNAs), phase shifters, attenuators, antenna beam-steering systems, charge pump devices, RF switches, etc. Such functions are useful in a variety of applications, such as radar systems (including phased array and automotive radar systems), radio systems (including cellular radio systems), and test equipment.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, 6G, and WiFi (e.g., 802.11a, b, g, ac, ax, be) protocols, as well as other radio communication standards and protocols.

Figure 9:
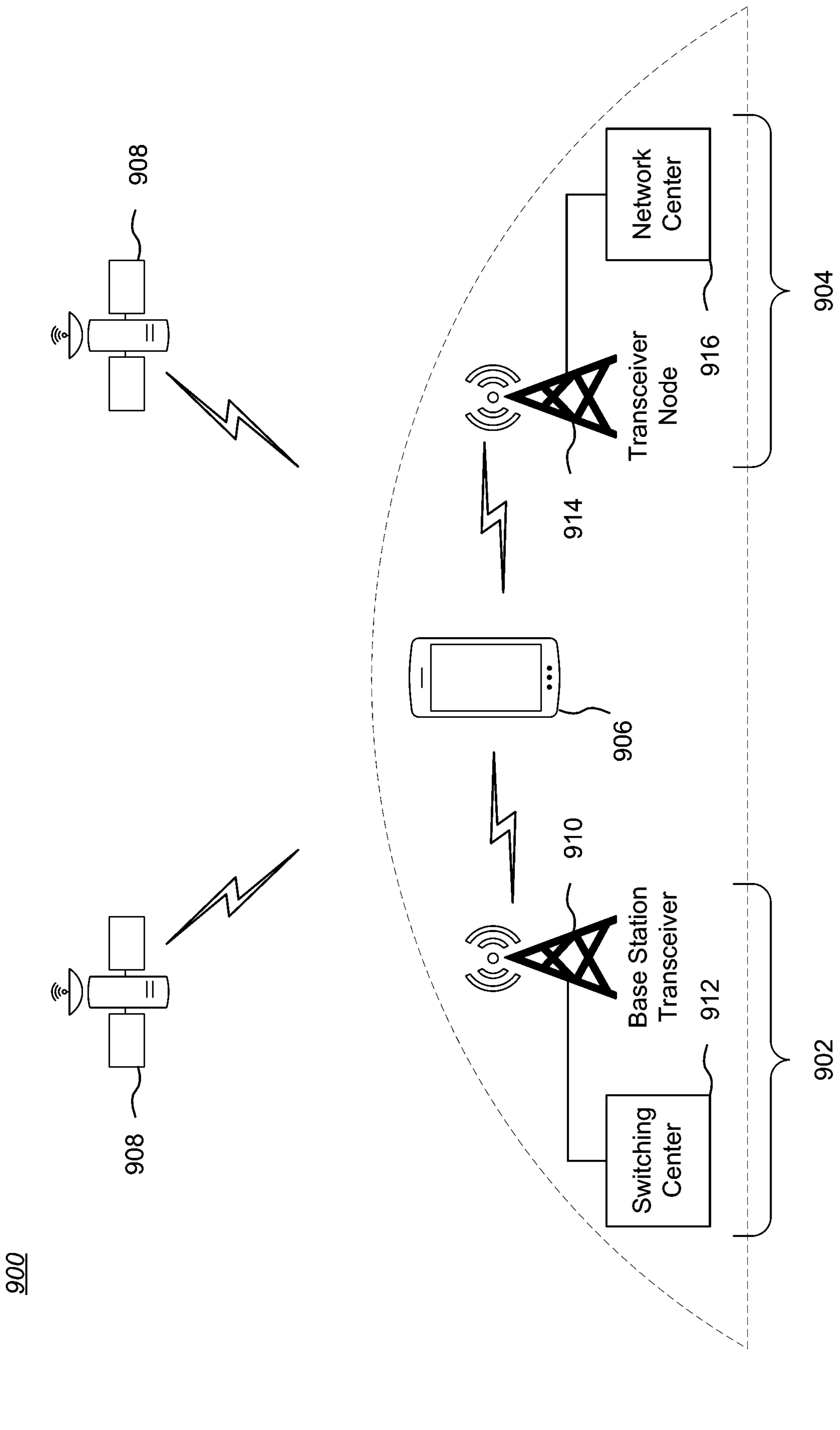
FIG. 9 (Prior Art)
FIG. 9 illustrates a prior art wireless communication environment comprising different wireless communication systems and, and which may include one or more mobile wireless devices.

As an example of wireless RF system usage, FIG. 9 illustrates a prior art wireless communication environment 900 comprising different wireless communication systems 902 and 904, and which may include one or more mobile wireless devices 906. A wireless device 906 may be a cellular phone, a wireless-enabled computer or tablet, or some other wireless communication unit or device. A wireless device 906 may also be referred to as a mobile station, user equipment, an access terminal, or some other terminology known in the telecommunications industry.

A wireless device 906 may be capable of communicating with multiple wireless communication systems 902, 904 using one or more of telecommunication protocols such as the protocols noted above. A wireless device 906 also may be capable of communicating with one or more satellites 908, such as navigation satellites (e.g., GPS) and/or telecommunication satellites. The wireless device 906 may be equipped with multiple antennas, externally and/or internally, for operation on different frequencies and/or to provide diversity against deleterious path effects such as fading and multi-path interference.

The wireless communication system 902 may be, for example, a CDMA-based system that includes one or more base station transceivers (BSTs) 910 and at least one switching center (SC) 912. Each BST 910 provides over-the-air RF communication for wireless devices 906 within its coverage area. The SC 912 couples to one or more BSTs 910 in the wireless system 902 and provides coordination and control for those BSTs 910.

The wireless communication system 904 may be, for example, a TDMA-based system that includes one or more transceiver nodes 914 and a network center (NC) 916. Each transceiver node 914 provides over-the-air RF communication for wireless devices 906 within its coverage area. The NC 916 couples to one or more transceiver nodes 914 in the wireless system 904 and provides coordination and control for those transceiver nodes 914.

In general, each BST 910 and transceiver node 914 is a fixed station that provides communication coverage for wireless devices 906, and may also be referred to as base stations or some other terminology known in the telecommunications industry. The SC 912 and the NC 916 are network entities that provide coordination and control for the base stations and may also be referred to by other terminologies known in the telecommunications industry.

Figure 10:
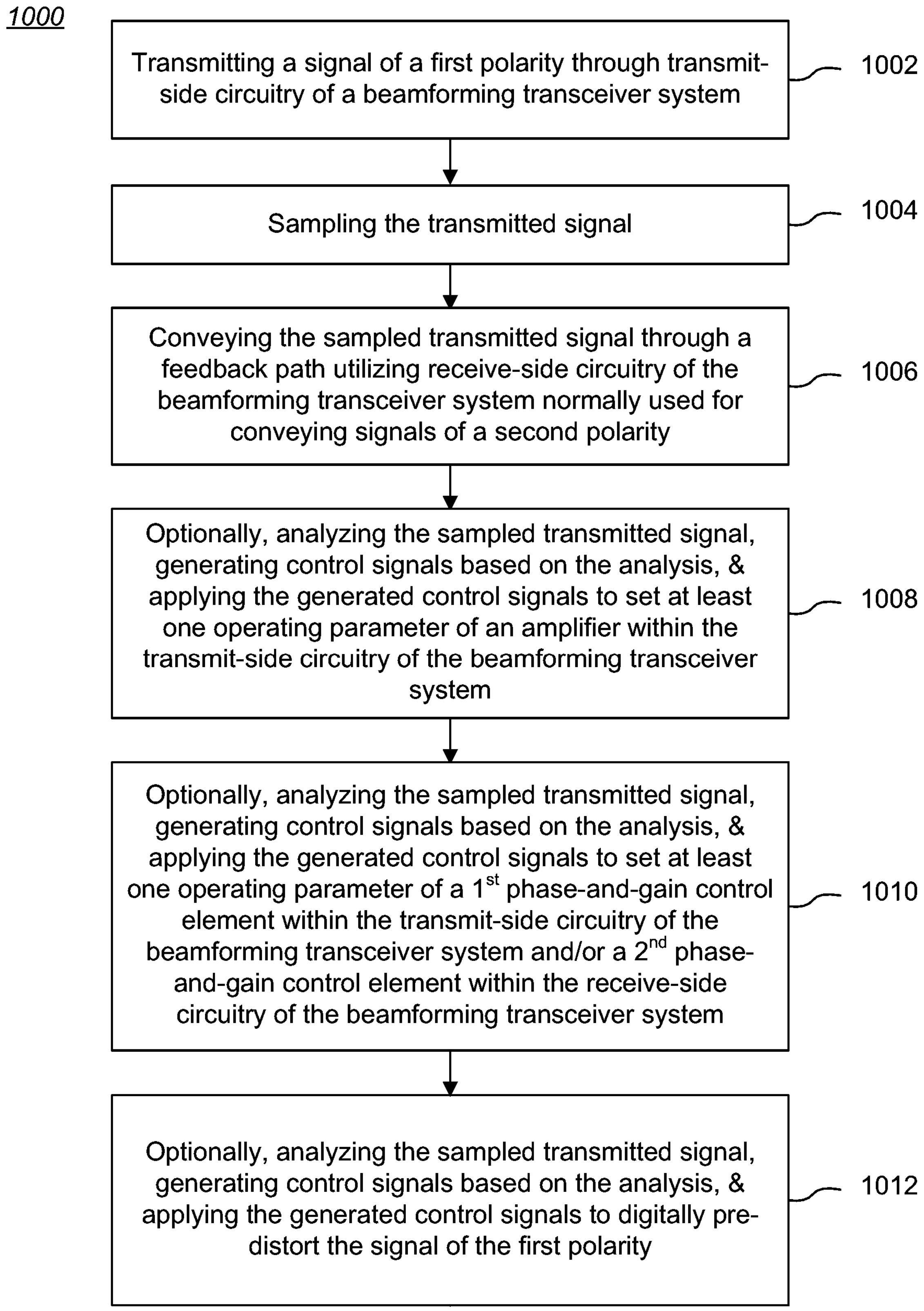
FIG. 10 is a process flow chart showing one method for measuring the linearity characteristics of a beamforming transceiver system.

Another aspect of the invention includes methods for measuring and controlling the linearity characteristics of a beamforming transceiver system. For example, FIG. 10 is a process flow chart 1000 showing one method for measuring the linearity characteristics of a beamforming transceiver system. The method includes: transmitting a signal of a first polarity through transmit-side circuitry of a beamforming transceiver system (Block 1002); sampling the transmitted signal (Block 1004); and conveying the sampled transmitted signal through a feedback path utilizing receive-side circuitry of the beamforming transceiver system normally used for conveying signals of a second polarity (Block 1006).

Additional aspects of the above method may include one or more of the following: optionally analyzing the sampled transmitted signal, generating control signals based on the analysis, and (1) applying the generated control signals to set at least one operating parameter of an amplifier within the transmit-side circuitry of the beamforming transceiver system (Block 1008), and/or (2) applying the generated control signals to set at least one operating parameter of a first phase-and-gain control element within the transmit-side circuitry of the beamforming transceiver system and/or a second phase-and-gain control element within the receive-side circuitry of the beamforming transceiver system (Block 1010), and/or (3) applying the generated control signals to digitally pre-distort the signal of the first polarity (Block 1012).

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions may be greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies, such as bipolar junction transistors (BJTs), BiCMOS, LDMOS, BCD, GaAs HBT, GaN HEMT, GaAs pHEMT, MESFET, InP HBT, InP HEMT, FinFET, GAAFET, and SiC-based device technologies, using 2-D, 2.5-D, and 3-D structures. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A beamforming transceiver system including:

(a) a first bidirectional signal port configured to convey a signal having a first polarization;

(b) a first signal splitter coupled to the first bidirectional signal port;

(c) a first phase-and-gain control element coupled to the first signal splitter;

(d) a first amplifier having an input coupled to the first phase-and-gain control element, and an output;

(e) a directional coupler having an input port coupled to the output of the first amplifier, an output port configured to be selectably coupled to a first terminal of an antenna, and a coupled port;

(f) a second bidirectional signal port configured to normally convey a signal having a second polarization;

(g) a second signal splitter coupled to the second bidirectional signal port;

(h) a second phase-and-gain control element coupled to the second signal splitter;

(i) a second amplifier having an output coupled to the second phase-and-gain control element, and an input configured to be selectably coupled to a second terminal of the antenna; and (j) a signal feedback path coupled between the coupled port of the directional coupler and any portion of a circuit path from the input of the second amplifier to the output of the second amplifier;

wherein a feedback signal generated through the coupled port of the directional coupler and having the first polarization is coupled through the second phase-and-gain control element and through the second signal splitter, functioning as a signal combiner, to the second bidirectional signal port.

2. The beamforming transceiver system of claim 1, wherein the first amplifier is a power amplifier.

3. The beamforming transceiver system of claim 1, wherein the second amplifier is a low-noise amplifier.

4. The beamforming transceiver system of claim 1, wherein the second amplifier is a low-noise amplifier and the feedback signal is coupled to the input of the low-noise amplifier.

5. The beamforming transceiver system of claim 1, further including:

(a) a sense pad/pin configured to be coupled to an external analysis circuit; and (b) a switch having an input terminal coupled to the coupled port of the directional coupler, a first output terminal coupled to the signal feedback path, and a second output terminal coupled to the sense pad/pin.

6. The beamforming transceiver system of claim 1, further including an analysis circuit selectably couplable to the feedback signal.

7. The beamforming transceiver system of claim 6, wherein the analysis circuit is configured to generate control signals applied to set at least one operating parameter of the first amplifier.

8. The beamforming transceiver system of claim 6, wherein the analysis circuit is configured to generate control signals applied to set at least one operating parameter of the first phase-and-gain control element and/or the second phase-and-gain control element.

9. The beamforming transceiver system of claim 6, further including a digital pre-distortion circuit configured to predistort a signal coupled to the first signal port, wherein the analysis circuit is configured to set parameter values within the pre-distortion circuit.

10. A beamforming transceiver system including:

(a) a first signal port configured to convey a signal having a first polarization;

(b) a first signal splitter coupled to the first signal port;

(c) a first phase-and-gain control element coupled to the first signal splitter;

(d) a first amplifier having an input coupled to the first phase-and-gain control element, and an output;

(e) a directional coupler having an input port coupled to the output of the first power amplifier, an output port configured to be selectably coupled to a first terminal of an antenna, and a coupled port;

(f) a second signal port configured to normally convey a signal having a second polarization;

(g) a second signal splitter coupled to the second signal port;

(h) a second phase-and-gain control element coupled to the second signal splitter;

(i) a second amplifier having an output coupled to the second phase-and-gain control element, and an input configured to be selectably coupled to a second terminal of the antenna; (j) a signal feedback path coupled between the coupled port of the directional coupler and any portion of a circuit path from the input of the second amplifier to the output of the second amplifier;

(k) a multilane bus;

(l) a switch matrix coupled to the multilane bus and configured to reduce the number of lanes to no more than two output lanes; and (m) a switch having an input terminal coupled to the coupled port of the directional coupler, a first output terminal coupled to the signal feedback path, and a second output terminal coupled to a lane of the multilane bus;

wherein a feedback signal generated through the coupled port of the directional coupler and having the first polarization is coupled through the second phase-and-gain control element and through the second signal splitter, functioning as a signal combiner, to the second signal port.

11. The beamforming transceiver system of claim 10, wherein the first amplifier is a power amplifier.

12. The beamforming transceiver system of claim 10, wherein the second amplifier is a low-noise amplifier.

13. The beamforming transceiver system of claim 10, wherein the second amplifier is a low-noise amplifier and the feedback signal is coupled to the input of the low-noise amplifier.

14. The beamforming transceiver system of claim 10, further including:

(a) a sense pad/pin configured to be coupled to an external analysis circuit; and (b) a switch having an input terminal coupled to the coupled port of the directional coupler, a first output terminal coupled to the signal feedback path, and a second output terminal coupled to the sense pad/pin.

15. The beamforming transceiver system of claim 10, further including an analysis circuit selectably couplable to the feedback signal.

16. The beamforming transceiver system of claim 15, wherein the analysis circuit is configured to generate control signals applied to set at least one operating parameter of the first amplifier.

17. The beamforming transceiver system of claim 15, wherein the analysis circuit is configured to generate control signals applied to set at least one operating parameter of the first phase-and-gain control element and/or the second phase-and-gain control element.

18. The beamforming transceiver system of claim 15, further including a digital pre-distortion circuit configured to pre-distort a signal coupled to the first signal port, wherein the analysis circuit is configured to set parameter values within the pre-distortion circuit.

* * * * *